No. 694,261. Patented Feb. 25, 1902.
M. D. ELLIS.
APPARATUS FOR PRESERVING FOODS.
(Application filed Mar. 29, 1901.)
(No Model.)

Witnesses
Fred E. Maynard
Scott Chandler

M. D. Ellis, Inventor.
By C. A. Snow & Co.
Attorneys

THE NORRIS PETERS CO., PHOTO-LITHO., WASHINGTON, D. C.

UNITED STATES PATENT OFFICE.

MARSHALL D. ELLIS, OF CONGRESS HEIGHTS, DISTRICT OF COLUMBIA, ASSIGNOR OF ONE-HALF TO GUY M. FIELD, OF HIGHPOINT, NORTH CAROLINA.

APPARATUS FOR PRESERVING FOODS.

SPECIFICATION forming part of Letters Patent No. 694,261, dated February 25, 1902.

Application filed March 29, 1901. Serial No. 53,542. (No model.)

*To all whom it may concern:*

Be it known that I, MARSHALL D. ELLIS, a citizen of the United States, residing at Congress Heights, Washington, District of Columbia, have invented a new and useful Apparatus for Preserving Food Products, of which the following is a specification.

This invention relates to devices for curing food products; and it has for its object to provide a construction including receptacles, such as shelves and tanks, which may receive the products to be preserved either in uncovered state or in metal vessels and means for charging the shelves and tanks with electricity in such manner that the current will affect the food products so as to kill all animal life therein, and thus prevent decay.

Further objects and advantages of the invention will be understood from the following description.

Figure 1:
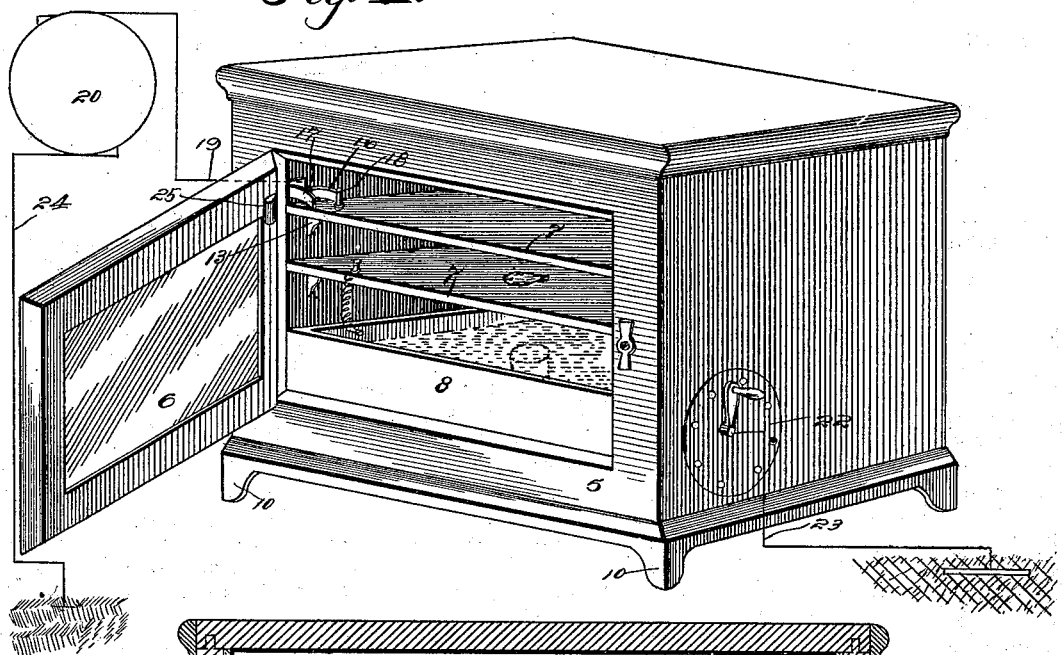
Figure 2:
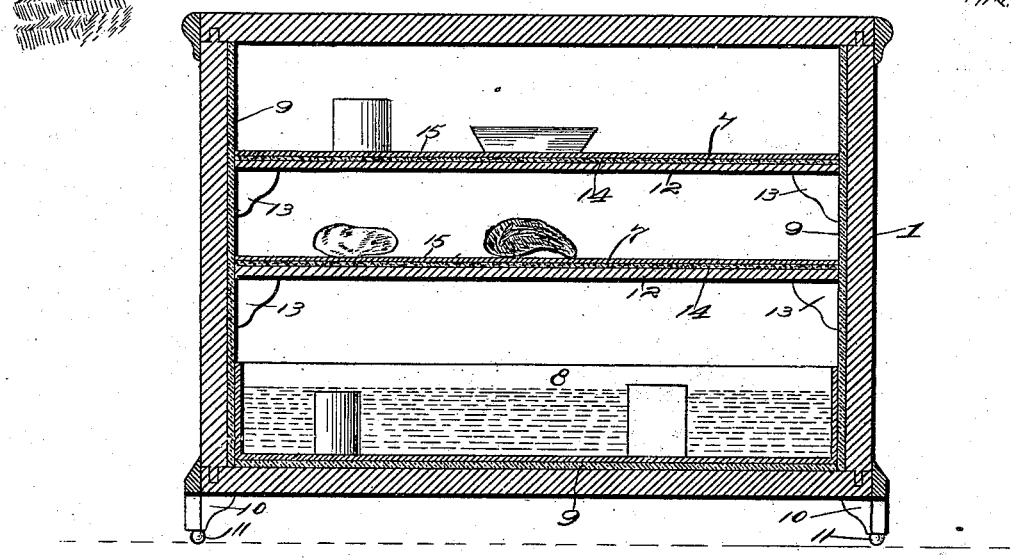

In the drawings forming a portion of this specification, and in which like numerals of reference indicate similar parts in the several views, Figure 1 is a perspective view showing an apparatus in the form of a chest embodying the present invention. Fig. 2 is a vertical central section taken longitudinally of the chest.

Referring now to the drawings, there is shown a chest 5, having the general shape of an ordinary refrigerator and provided with a hinged door 6. In the upper portion of the chest are disposed horizontal shelves 7, while in the lower portion below the shelves is a tank 8.

The outer portion of the chest 5 is of wood, and to render certain that no currents shall pass from the interior of the chest it is provided with a lining 9 of glass, which covers the bottom and sides. Furthermore, the feet 10 of the chest have glass supporting-casters 11. Each of the shelves in the chest consists of a board 12, which is supported at its ends upon brackets 13, and upon this board is disposed a coating 14 of asbestos, while upon the asbestos is a metal plate 15, the front and side edges of which are bent downwardly over the corresponding edges of the board and asbestos to prevent displacement of the plate, the asbestos acting to prevent scorching of the board from the plate. The tank 8 is of metal and is adapted to receive water or other suitable conducting liquid. Upon the uppermost shelf and electrically connected with plate 15, which is preferably of copper, is a contact-strip 16, while a movable contact-finger 17 is mounted upon a post 18, supported upon but insulated from the plate 15, this contact-finger having a wire 19 leading therefrom to a dynamo 20 or other suitable source of electricity. The end of the upper shelf farthest from the finger 17 is electrically connected with the adjacent end of the plate 15 therebelow, and the opposite end of this lower plate is electrically connected with the adjacent end of the tank 8, the opposite end of the tank being connected with a rheostat 22 for controlling the current passing through the shelves and tank. Leading from the rheostat is a wire 23, which is grounded, and a wire 24 also is provided for grounding the dynamo. To close the circuit between the contact finger and strip upon the upper shelf, a lug 25 is fixed upon the inner face of the door and in such position that when the door is closed it engaged the contact-finger and pressed it against the strip.

In the use of this apparatus the products to be preserved if in solid form may be placed directly upon the plates 15 or if in liquid form may be placed in suitable receptacles on the shelves, as indicated in Fig. 2, while, if preferred, liquids may be placed in suitable vessels and the vessels then immersed in the liquid in the tank. With a current of suitable intensity it is found that the animal life in the food products is killed, with the well-known results.

In practice modifications of the specific construction shown may be made, and any suitable materials and proportions may be used for the various parts without departing from the spirit of the invention.

What is claimed is—

1. A device of the class described comprising a plurality of conducting-supports connected in series, an insulated inclosing casing for the supports, a switch for opening and closing the circuit of the supports, and means carried by the door for operating the circuit-closer.

2. The combination with a casing having insulated walls, a series of shelves or supports of conducting material connected in series, a door for said casing, a switch to which the terminals of an electric circuit are connected, and means carried by the door for opening said switch and breaking the circuit when the door is open.

3. The combination of the casing having in its lower portion a liquid-containing vessel or tank formed of conducting material, superposed shelves or supports also formed of conducting material, said tank and shelves being insulated from the casing, a switch or circuit-breaker to which the terminals of an electric circuit are connected, and means carried by the door for operating said circuit-breaker.

In testimony that I claim the foregoing as my own I have hereto affixed my signature in the presence of two witnesses.

MARSHALL D. ELLIS.

Witnesses:
FRANK S. APPLEMAN,
GEO. H. CHANDLEE.